March 2, 1948. W. E. LAMBERT Re. 22,979

CONVEYING RIG

Original Filed Dec. 31, 1936 3 Sheets-Sheet 1

Inventor
Walter E. Lambert
By Byrne Kelly & Lowder
his Attorneys

March 2, 1948. W. E. LAMBERT Re. 22,979

CONVEYING RIG

Original Filed Dec. 31, 1936 3 Sheets-Sheet 2

Inventor:
Walter E. Lambert
By
Cyrus Keller & Sweeten
his Attorneys

March 2, 1948. W. E. LAMBERT Re. 22,979
CONVEYING RIG
Original Filed Dec. 31, 1936 3 Sheets-Sheet 3
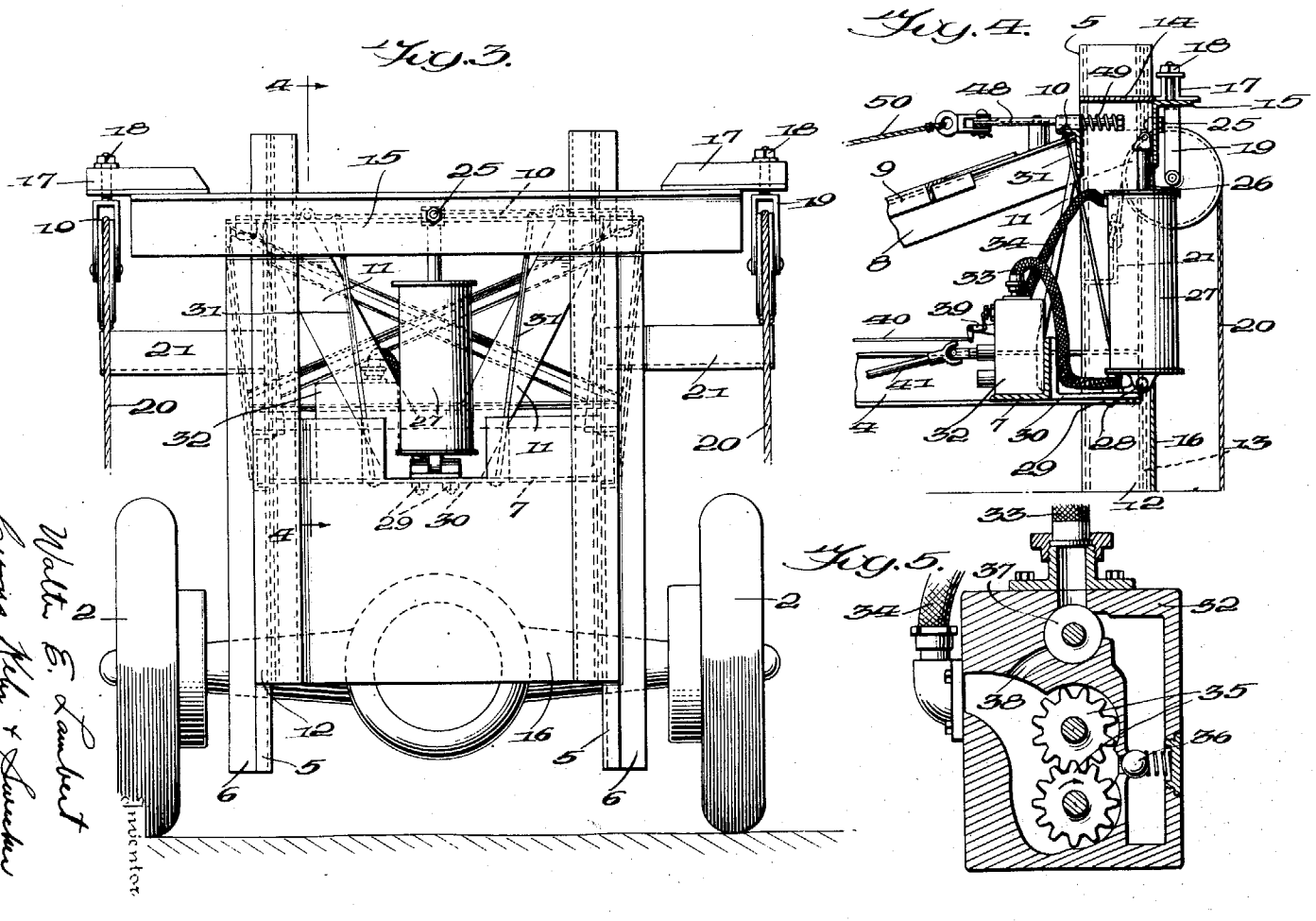
Inventor
Walter E. Lambert
By Cyprus Kehr & Swecker
his Attorneys Reissued Mar. 2, 1948 Re. 22,979

UNITED STATES PATENT OFFICE 22,979

CONVEYING RIG

Walter E. Lambert, Maryville, Tenn., assignor to McMurray Structural Steel Company, Inc., Nashville, Tenn., a corporation of Tennessee Original No. 2,210,323, dated August 6, 1940, Serial No. 118,653, December 31, 1936. Application for reissue November 5, 1947, Serial No. 784,141

19 Claims. (Cl. 214—119)

This invention relates to an improvement in conveying rigs of the type set forth in my prior application, Serial No. 734,387, filed July 9, 1934, on Conveying equipment, now Patent No. 2,062,-227, granted November 24, 1936.

In conveying equipment of the type set forth in my former application, it has been customary to employ a rig mounted on a vehicle chassis in connection with a series of skips which may be individually loaded with material, such as dirt, rock, and the like, while disconnected from the rig, and which skips are then picked up by the rig and transported to the point of dumping, dumped and then returned to be refilled. During the filling, the skips are not attached to the rig but are separate in order to permit one rig to be used in transporting and dumping a number of skips, very often five or six. In this way, the time and cost of operating the truck chassis, including the driver thereof, is conserved so that the truck does not remain idle, while its container is being loaded, and the truck may operate continuously back and forth between the points of filling and dumping in transporting the various skips as they are filled.

In the conveying equipment set forth in the above-mentioned application, a cable hoist was employed in order to handle the skips, using cables wound on a drum which were let out or wound up as occasion demanded in lowering or raising the skips.

The object of this invention is to improve the handling of the skips, the attachment thereof to the rig or detachment therefrom, from the standpoint of transporting and dumping the skips as they are filled.

This is accomplished in the present invention by the use of a movable frame structure which is designated here as a shuttle and which is operated by a hydraulic hoist in order to raise the same, the fluid being supplied by a suitable pump operated from a power take-off on the vehicle. This shuttle has provision for raising and lowering the skip in its upward and downward movement, such as by means of cables, which pass over sheaves on the shuttle, being detachably connected at one end with the skip and being secured at the other end to a stationary part of the rig, so that upon raising the shuttle and carrying with it the sheaves, the cables are drawn therethrough, in order to raise the skips against the frame of the rig.

The rig and the shuttle frame are built sturdy and rigid for smooth operation and yet securely support the filled skips to the point of dumping.

A preferred embodiment of this invention is illustrated in the accompanying drawings, in which:

Fig. 3 is a rear elevation of the rig with the skip omitted;

Fig. 4 is a partial vertical sectional view, taken substantially on the line 4—4 of Fig. 3;

Fig. 5 is a sectional view through the hoist pump; and

Figure 1:
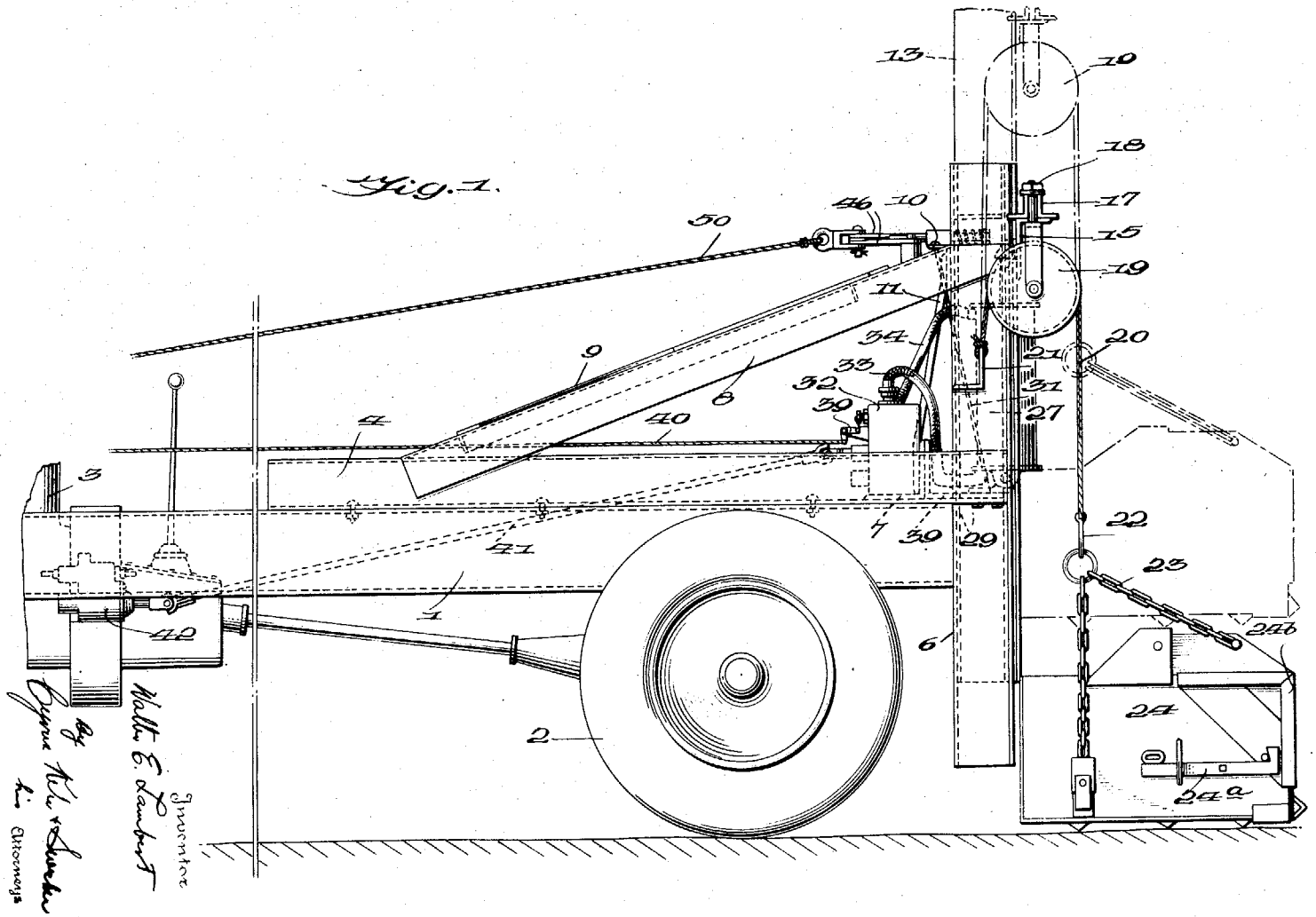
Fig. 1 is a side elevation of the main portion of a rig embodying this invention.

The invention is shown applied to a vehicle chassis, having the usual chassis frame 1, supported on ground wheels 2, adapted to be driven by the usual engine unit 3, mounted in the chassis.

The rig includes a frame structure mounted on the chassis, comprising side bars 4, rigidly secured to the chassis frame. The side bars 4 preferably are channel guides, turned edgewise upon the chassis frame and rigidly secured thereto. At the rear ends of the side bars 4, corner posts are secured and extend in an upward direction, substantially vertically, each of which corner posts consists of an upright channel bar or guide 5, carried and braced by an angle bar 6, to which the same is secured and which is also secured to the side bar 4. The channels 5 of the corner posts are turned inward toward each other to receive a shuttle or cross head therebetween, as will be described hereafter. The side bars 4 are braced at their rear ends by means of a transverse bar 7, the opposite ends of which are secured to the side bars 4. The upper ends of the corner posts are braced by brace bars 8, which are in the form of angle bars preferably, and which extend from the side bars 4 to points near the upper ends of the corner posts, the rear ends of the brace bars 8 being secured to the angle bars 6. Diagonal or cross braces 9 extend between the brace bars 8 and hold the same properly separated in lateral relation. The upper ends of the corner posts are strengthened and braced further by means of a transverse brace bar 10, which has its opposite ends secured to the brace bars 8 at the rear faces of the channel guides 5, as shown in Fig. 4. As a further means of strengthening the frame, upright braces 11 extend from the transverse brace bar 7 upwardly to the upper transverse brace bar 10, to strengthen the latter and to facilitate the holding of the corner posts in proper relation, even when loaded.

Figures 2, 6:
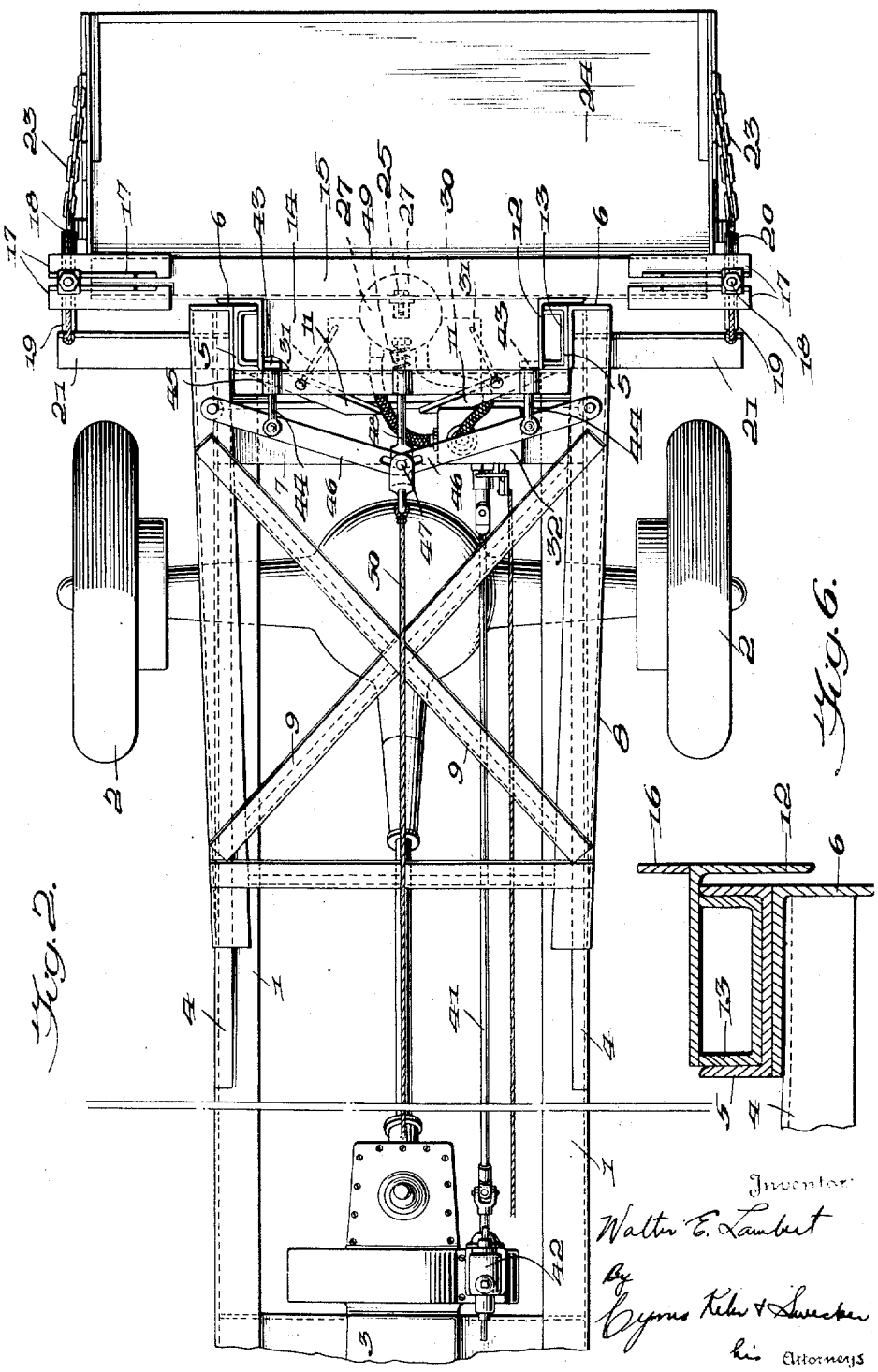
Fig. 2 is a top plan view thereof.
Fig. 6 is a horizontal sectional view through one of the corner posts of the rig frame.

The rig frame just described is adapted to receive and guide a shuttle which comprises upright angle bars 12 having runners 13, secured to the outer faces thereof, as shown in Figs. 2 and 6, which runners 13 are received in channel guides 5 for sliding vertical movement. The angle bars 12 are braced at their upper ends by a plate 14 which extends therebetween and also by a cross bar 15, secured to the faces of the angle bars 12. A plate 16 extends vertically between the rear edges of the angle bars 12 to hold the same in properly spaced relation and to act as an abutment and shield for the skip and the dirt or other material therein.

The opposite ends of the cross bar 15 support brackets 17 between which are mounted swivels 18, carrying sheaves 19. A cable 20 passes over each of the sheaves and has one end permanently anchored to an anchor bar 21, which projects laterally from and is secured to the corner angle bar 6. The opposite end of each cable 20 carries a hook 22 adapted for detachable fastening with an end connection 23 of a skip 24. The construction of this skip and the manner of operation thereof, is set forth fully in my pending application on Conveying skips, Serial No. 8380, filed February 26, 1935, now Patent No. 2,085,029, granted June 29, 1937.

The cross bar 15 has a pivotal connection 25 with a piston rod 26 of a hydraulic power device having the usual piston operating in a cylinder 27, under fluid pressure, for raising the shuttle when it is desired to lift and transport the skip. The lower end of the cylinder 27 is carried by trunnions 28, journaled, such as in U-bolts 29, on the bracket 30 carried by the rear side of the transverse brace bar 7, to which the bracket 30 is secured. Tie rods 31 extend upwardly from the rearward edge of the bracket 30 to the transverse brace bar 10, in order to brace the bracket 30 and hold it in place.

The power device 27 is designed to be operated hydraulically by a charge of oil or other fluid from a suitable pump designated generally by the numeral 32. Any suitable pump may be used for this purpose, the one shown in Fig. 5 being an ordinary gear pump which is well-known in the art and has conduits 33 and 34 leading respectively to the bottom and top of the cylinder 27 for the interchange of fluid between the pump and the respective sides of the piston in a well-known manner. In raising the shuttle and the skip, it is desired to pump the fluid into the lower end of the power device through the conduit 33, for which purpose the gears 35 are operated in the direction shown by the arrows in Fig. 5, the fluid passing a check-valve 36 and a manually controlled valve 37, thence into the conduit 33, leading into the lower end of the power device. A by-pass 38 is provided in the body of the pump 32 for the passage of the fluid from the conduit 33 to the conduit 34 in lowering the shuttle. The valve 37 may be adjusted manually to be open either to the conduit 33 or through the by-pass 38, as desired.

The valve 37 may be controlled by a bell-crank lever 39 pivotally supported at one side of the pump and operated by a rod 40 leading to a suitable lever, not shown, within convenient reach of the operator.

The gears 35 of the pump are adapted to be driven by a drive shaft 41 having suitable driving connections and extending to a power take-off 42 attached to a side of the flywheel housing of the power plant 3, which housing encloses the usual flywheel, the gearing of which is geared through the power take-off to the pump shaft 41.

The conveying rig is designed to be used for transporting and dumping skips containing material such as dirt, rocks, etc., which skips usually are loaded manually. In order to prevent loss of time of the rig and its operator, this invention has provision for the individual transportation and conveyance of each of a plurality of skips, which may be conveyed as they are filled for dumping and then returned to the point of filling. For this purpose, the rig may be detachably connected with the individual skips by hooking onto the flexible connections 23 with the hooks 22, while the shuttle of the rig is in its lower position, as shown in Fig. 1. Then upon operation of the pump 32, oil or other fluid is pumped into the lower end of the cylinder 27 forcing the piston upwardly therein and thereby raising the shuttle in the guides 5. Since the cables 20 are anchored at one end, this vertical movement of the shuttle and its sheaves 19 causes movement of the cables 20 therethrough, shortening the rearward arms of the cables and thereby raising the skip against the rear side of the shuttle frame, substantially as indicated by dotted lines in Fig. 1.

The skip is held in this position during transportation to the point of dumping, where upon release of a latch 24*a*, the door 24*b* of the skip opens and discharges the material, after which the skip automatically rights itself, closing the door and is ready for transportation back to the point of filling. The valve 37 may be moved to another position for interchange of fluid between opposite sides of the piston in the power device to lower the shuttle and permit disconnection of the skip therefrom, so that the rig may then be used for attachment to another skip as above described.

In order to relieve the pump and power device from supporting the weight of the skip during transportation and dumping, stop plates 43 are attached to the inner sides of the shuttle bars 12, and have pins 44, slidably mounted in guides 45 on the transverse bar 10, in position to ride against the faces of the stop plates 43 when the shuttle is in its lowered position and to engage under the stop plates 43 when the shuttle is in its elevated position, so that these pins 44 assist in holding the weight of the shuttle and of the skip. The pins 44 are adapted to be pressed in a rearward direction by toggle levers 46 connected with the pins and pivoted together at 47, which pivot 47 has a rod 48 connected therewith, which rod 48 is acted on by a spring 49 tending to move the pins 44 against the stop plates 43. A connection 50 leads from the pivot 47 to a position within convenient reach of the operator to permit him to withdraw the pins when it is desired to lower the skip.

The construction described and illustrated provides a rigid and secure rig structure for the transportation and dumping of material by means of skips and both the rig frame and the shuttle are sturdy and rigidly braced for the handling of the loads imposed thereon in the use of the invention. The connections between the structural parts of the structural frames are not illustrated because these parts preferably are welded together, although it is evident that they may be secured by rivets or bolts, as desired.

I claim:

1. In conveying equipment, the combination of a rig having an upright trackway thereon, a shuttle operatively mounted in the trackway for up and down movement therein, one or more cable guides carried by the shuttle, a skip container of greater length than the width of the trackway, and flexible means laterally outside of the trackway and extending over the guide or guides and having one end thereof connected with the rig and the other end having means for detachable connection with the skip for raising and lowering the same upon up and down movement of the shuttle.

2. In conveying equipment, the combination of a rig having an upright trackway thereon, a shuttle operatively mounted in the trackway for up and down movement therein, one or more cable guides carried by the shuttle, flexible means extending over the guide or guides and having one end thereof connected with the rig and the other end adapted to support a skip for raising and lowering the same upon up and down movement of the shuttle, and hydraulic means pivotally connected directly with the rig and shuttle respectively for moving the shuttle upwardly relative to the trackway.

3. In conveying apparatus, the combination of a rig having an upright trackway thereon, a shuttle slidably mounted in the trackway for up and down movement relative thereto, cable guides secured to the shuttle on lateral outer sides of the trackway, a skip, and cables passing over the cable guides and each having one end permanently fastened to the rig and the other end detachably engaging an end connection of the skip for supporting the same.

4. In conveying apparatus, the combination of a rig having an upright trackway thereon, a shuttle slidably mounted in the trackway for up and down movement relative thereto, cable guides secured to the shuttle on lateral outer sides of the trackway, a skip, cables passing over the cable guides and each having one end permanently fastened to the rig and the other end detachably engaging an end connection of the skip for supporting the same, and a hydraulic power device having a piston rod connected directly with the shuttle for raising and lowering the same in the trackway.

5. In conveying equipment, the combination of a rig, including a frame having an upright trackway thereon, a shuttle slidably mounted on said trackway and having means connected therewith adapted to be connected with a skip for raising and lowering the same, and a fluid power device including a cylinder and a piston pivotally connected with the rig frame and shuttle.

6. In conveying equipment, the combination of a rig including a frame having an upright trackway thereon, a shuttle slidably mounted on the trackway and adapted to be connected with a skip for raising and lowering the same, and a power device including a cylinder pivotally connected with the rig frame and a piston and piston rod operatively mounted in the cylinder and connected with the shuttle for moving the same along the trackway.

7. In conveying equipment, the combination of a rig having a frame and an upright trackway thereon, a shuttle slidably mounted on the trackway, means operatively connected with the shuttle and adapted to support a skip for raising and lowering the same, and a hydraulic power device including a cylinder pivotally connected with the rig frame, a piston slidably mounted in the cylinder, and a piston rod connected with the piston and pivotally connected with the shuttle for operating the same.

8. In conveying equipment, the combination of a rig frame including an upright trackway, a shuttle slidably mounted on the trackway for up and down movement relative to the rig frame, said shuttle being adapted to be connected with a skip for raising and lowering the same, hydraulic means carried by the rig frame and operatively connected with the shuttle for moving the same, pins carried by the rig frame in position to slidably engage under a portion of the shuttle in elevated position to lock said shuttle, toggle levers connected with the pins, resilient means connected with the levers tending to move the pins to locking positions, and means connected with the toggle levers for withdrawing the pins to release the shuttle.

9. In conveying equipment, the combination of a rig frame having upright guides on opposite sides thereof, braces for said guides, a shuttle having runners slidably mounted in the guides for vertical movement of the shuttle relative thereto, anchor bars attached to the rig frame, sheaves carried by the shuttle, a skip having end connections, cables extending over the sheaves and having one end secured to the anchor bars and the other end connected with the end connections of the skip, and a hydraulic power device including a cylinder pivotally supported by the rig frame and extending upwardly between the guides, said power device having a piston and piston rod operatively mounted in the cylinder and connected with the shuttle for raising or lowering the same.

10. In conveying equipment, a shuttle including upright bars having runners on opposite sides thereof adapted to engage in a trackway, a cross bar extending between the upright bars and connecting the same together adjacent the upper ends thereof, and a plate extending between the lower portions of the upright bars to hold the same in properly spaced relation.

11. In conveying equipment, the combination of a motor vehicle having a chassis frame, a rig frame mounted on the rear portion of the chassis frame and having upright guides on opposite sides thereof at the extreme rear end of said frame, a shuttle extending from side-to-side between the guides and having runners slidably mounted on the guides for upright movement relative thereto, a conveying skip having connections at opposite ends thereof, cable guides carried by the shuttle at opposite ends thereof, cables extending over the cable guides and each having one end attached to the adjacent end connection of the skip and the other end attached to the rig frame, and a hydraulic power device connected with the shuttle between the guides for operating said shuttle to raise and lower the skip relative to the rig frame.

12. In conveying equipment, the combination of a motor vehicle chassis having a source of power thereon, a rig frame mounted on the chassis at the rear portion thereof and having upright guides on opposite sides of said chassis at the extreme rear thereof, a shuttle extending from side-to-side of the rig frame and having runners slidably mounted on the guides, a transverse bar carried by the shuttle rearwardly of the upright guides, cable guides carried by opposite end portions of said transverse bar, a conveying skip having end connections, cables extending over the cable guides and each having one end attached to the adjacent end connection of the skip and the opposite end permanently fixed to the rig frame, and a hydraulic power device connected with the shuttle intermediate the upright guides for raising and lowering the skip relative thereto.

13. In conveying equipment, the combination of a motor vehicle chassis having a source of power thereon, a rig frame mounted on the chassis at the rear portion thereof and having upright guides on opposite sides of said chassis at the extreme rear thereof, a shuttle extending from side-to-side of the rig frame and having runners slidably mounted on the guides, a transverse bar carried by the shuttle rearwardly of the upright guides, cable guides carried by opposite end portions of said transverse bar, a conveying skip having end connections, cables extending over the cable guides and each having one end attached to the adjacent end connection of the skip and the opposite end permanently fixed to the rig frame, a hydraulic power device connected with the shuttle intermediate the upright guides for raising and lowering the skip relative thereto, said power device including a cylinder pivotally attached at one end to the rig frame and having a piston therein with a piston rod extending through the opposite end and pivotally attached to the transverse bar, and means for operating said power device from the source of power on the motor vehicle.

14. In conveying equipment, the combination of a motor vehicle having a chassis frame, a rig frame mounted on the rear portion of the chassis frame and having upright guides on opposite sides thereof, a shuttle extending between the guides and slidably mounted for upright movement relative thereto, a conveying skip container having connections at opposite end portions thereof, cable guides carried by the shuttle at opposite ends thereof, cables extending over the cable guides and each having one end attached to the adjacent end connection of the skip container and the other end attached to the rig frame, and a hydraulic power device connected with the shuttle for operating said shuttle to raise and lower the skip container relative to the rig frame.

15. In conveying equipment, the combination of a motor vehicle having a chassis frame, a rig frame mounted on the rear portion of the chassis frame including upright guides at opposite side portions, a shuttle slidably mounted between the guides for upright movement relative thereto, a conveying skip container of greater length than the width of the rig frame and having connections at opposite end portions thereof, means laterally outside of the upright guides and connected with the shuttle and having detachable engagement with said end connections, and a hydraulic power device connected with the shuttle for operating said shuttle to raise and lower the skip container relative to the rig frame.

16. In conveying equipment, the combination of a motor vehicle having a chassis frame, a rig frame mounted on the rear portion of the chassis frame including upright guides at opposite side portions, a shuttle slidably mounted between the guides for upright movement relative thereto, a conveying skip container of greater length than the width of the rig frame and having connections at opposite end portions thereof, means laterally outside of the upright guides and connected with the shuttle and having detachable engagement with said end connections, and means connected with the shuttle for operating said shuttle to raise and lower the skip container relative to the rig frame.

17. In conveying equipment, the combination of a motor vehicle having a chassis frame, upright guides mounted on the chassis frame, a shuttle slidably mounted on the guides for upward movement relative thereto, a conveying skip container of greater length than the width of the rig frame and having connections at opposite end portions thereof, said skip container being free from guiding movement on the shuttle for disconnection and bodily movement laterally therefrom, means laterally outside of the upright guides and connected with the shuttle and having detachable engagement with said end connections for supporting the skip therefrom, and means connected with the shuttle for operating said shuttle to raise and lower the skip container relative thereto.

18. In conveying equipment, the combination of a motor vehicle having a chassis frame, a conveying skip container, said skip container being bodily detachable from the chassis frame for filling separate from the vehicle and for bodily movement of the vehicle relative thereto, said skip container having connections at opposite end portions thereof, a device mounted on the chassis frame for upward movement relative thereto, said device having means laterally outside of the chassis frame for detachable engagement with said end connections, and means for raising said device to elevate the skip container onto the chassis frame, said skip container being constructed for tipping action to dump the contents therefrom while said skip container is supported by said elevating device.

19. In conveying equipment, the combination of a motor vehicle having a chassis frame, a conveying skip container, said skip container being bodily detachable from the chassis frame for filling separate from the vehicle and for bodily movement of the vehicle relative thereto, said skip container having connections at opposite end portions thereof, a device mounted on the chassis frame for upward movement relative thereto, said device having means laterally outside of the chassis frame for detachable engagement with said end connections, hydraulic means for raising said device to elevate the skip container onto the chassis frame, said skip container being constructed for tipping action to dump the contents therefrom while said skip container is supported by said elevating device, and means on the chassis frame against which the skip container bears during transportation tending to prevent side sway of the container relative to the chassis frame.

WALTER E. LAMBERT.

Certificate of Correction

Reissue No. 22,979. March 2, 1948.

WALTER E. LAMBERT

It is hereby certified that the above numbered patent was erroneously issued to "McMurray Structural Steel Company, Inc., of Nashville, Tennessee, a corporation of Tennessee" whereas said patent should have been issued to *Dempster Brothers, Inc., a corporation*, as assignee of the entire interest therein, as shown by the record of assignments in this office; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*